Aug. 24, 1954     J. M. GAROUTTE ET AL     2,687,290
TREATMENT OF RECOVERED CEMENT KILN DUST
Filed Jan. 4, 1950
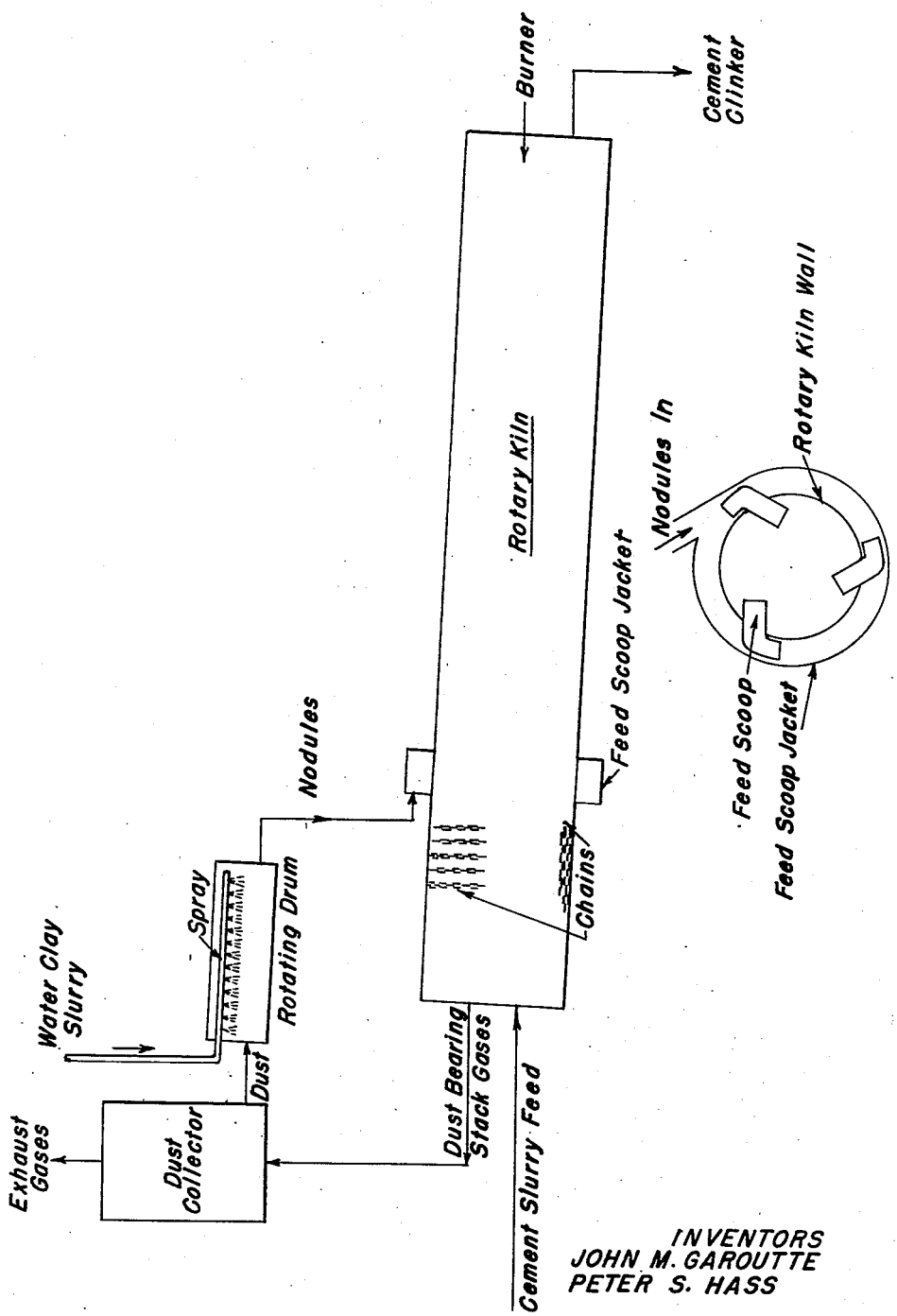
INVENTORS
JOHN M. GAROUTTE
PETER S. HASS

UNITED STATES PATENT OFFICE 2,687,290

TREATMENT OF RECOVERED CEMENT KILN DUST

John M. Garoutte, Palo Alto, and Peter S. Hass, Los Altos, Calif., assignors to Permanente Cement Company, Oakland, Calif., a corporation of California Application January 4, 1950, Serial No. 136,852

3 Claims. (Cl. 263—53)

This invention relates to a method of calcining, or burning, and recovering agglomerates or reacted products of finely divided inorganic materials, and it especially concerns such treatment of collected industrial dusts.

It is well known that in many industrial operations, dusts produced, for example by combustion, or the roasting of ores or of mixtures of many types, represent an important problem. On the one hand, if the dusts are allowed to escape into the atmosphere they represent a nuisance to the surrounding area or countryside as they contaminate the air and also settle eventually, with the attendant disadvantages. On the other hand, when these dusts are collected, as they normally are, at least in industrial and agricultural areas, the collected dusts have the disadvantages of being difficult to reprocess, hazardous to simply discard and, therefore, expensive in disposal. In any case, a dust product represents a loss to the operator, which may amount to from 50 tons to 600 tons per day in, for example, normal rotary kiln operations. On a relative basis, it can be said that there is a minimum of 5% dust load in the combustion gases in rotary or other kiln operations where finely ground mineral material or synthetic mixes of such material, for example, cement compositions, are being processed.

As stated above, collection of such dusts has long been necessary. However, efficient utilization of the dusts collected or recovered from the waste gases issuing from a calcining or firing or heat-treating zone has been a problem as yet unsolved, although numerous processes have been devised with this object in view. The collected dusts are not merely finely divided solids but they are classifiable as dispersoids. Mechanical dispersoids, that is, those produced by mechanical comminution, are of particle sizes ranging from about 5 to about 50 microns diameter; while condensed dispersoids, that is, those produced by condensation from a vapor phase, are from about 0.3 to about 3 microns. In many collected industrial dusts, the particles are combinations of these. For instance, as will be noted in literature sources, cement-kiln dust is made up of particles wherein the alkali salt, vaporized in the kiln operation, will have condensed upon the surfaces of irregular dust particles mechanically carried over in the kiln gases. Such kiln dust is still in dispersoid state, however. Many collected dusts consist of particles predominantly less than 43 microns in diameter.

Because of these small sizes and the resulting tendency of such dispersoids to be easily taken up by further currents of gases, their utilization anew in the processes concerned poses a considerable problem. Where it is attempted to feed the dry dust back into the heating or firing zone the dry dust is not caused to substantially coalesce by such treatment, particularly where the very small, dispersoid particles are present, but it is found, rather, that it is rapidly entrained by the gases flowing through and out of the zone, and that it passes out again substantially unchanged. If dry dust is mixed into a slurry feed going to the kiln it tends strongly to form, in the slurry, balls having dry dust cores and coatings of slurry, so that the dust of the cores is released again during passage through the kiln, and again entrains in the effluent gas stream.

Another characteristic of such dusts is that they have been changed chemically by the calcination or firing step and are not the same, therefore, as the raw materials originally entering the zone of combustion. For instance, the dusts sometimes have hydraulic properties, and this circumstance presents a further problem. It has been noted, for instance, that collected cement kiln dust will undesirably increase the viscosity of a cement slurry when added thereto. Processes have been devised in an attempt to overcome this effect, but have been time-consuming, wasteful and cumbersome. If collected cement or other dusts are added back to slurries of the respective starting materials, it is found that, in wet-processing, mud rings build up within a rotary kiln, for example, or, in dry processing, clinker rings may similarly develop, which decrease flow of gases and considerably reduce the efficiency of the operations, necessitating shutdown and cleaning at intervals. Furthermore, when working either with dry or wet (for example, slurried) starting materials, the collected dusts are extremely difficult to admix.

It has now been discovered that these disadvantages are overcome by forming agglomerates of the collected dusts with addition of water, and then re-introducing the agglomerates into the incoming raw material being calcined, or heat-processed. The dusts can be agglomerated by briquetting under pressure, or by nodulizing, or by admixture with water and extrusion to form pellets, or by forming pellets in other known ways, or by forming the desired agglomerates in any suitable manner.

If desired, other materials can be admixed with the dust prior to or during agglomeration, to produce a particle or piece of any desired chemical composition. This is quite advantageous in some instances. For example, cement kiln dust can be corrected with the addition of clay or silica, and a very intimate admixture is obtained because of the very small particle size of the dust. In some processes, as for instance, in burning lime, the collected dust, where of suitable plasticity, is advantageously moistened and briquetted under pressure and then fed back to the kiln. In burning dolemite or magnesite, or in the collection of gypsum dust, or, in other words, in burning inorganic mineral material decomposable by heat, the dust material is suitably nodulized while spraying with a relatively small amount of water, and the nodules fed back into the kiln. Other collected finely divided materials, recovered from gases issuing from zones wherein inorganic materials are being fired or calcined, can be recovered by the method of the present invention. The collected dusts can be admixed with other fine dusts, such as ore dusts recovered in screening operations, etc.

The collected dusts, for example, which have been recovered from stack gases by electrical precipitation or by other methods, are agglomerated with the addition of water. As stated, the agglomeration can be effected by nodulizing, pelleting, extruding, briquetting or in any other desired manner, with or without application of pressure. For instance, the dust can be admixed with water, and if desired with other materials, for example, clay or other correctives or other dusts, and pressed, under any desired pressure, into pellets or briquettes; or it can be pugged with water, while or after mixing with such other materials if desired, extruded through a die device, and cut into suitable lengths to form pellets. Alternatively it can be fed into a nodulizing drum and water or slurry or solution can be added while the drum rotates, to form nodules. Preferably, just sufficent water, for instance, from 10% to 25% by weight, is added, in any of these methods, to moisten and form into the desired agglomerates. For example, from about 12% to about 20% of water is preferably added in nodulizing, and from about 15% to about 25% is added in forming by extrusion.

The dust agglomerates are introduced into the heat-treating process, suitably into a zone which is at a lower temperature than the temperature at which the inorganic material is being sintered, roasted, fired or deadburned. The agglomerates can be admixed with the raw feed prior to or at the time of introduction into the heat-treating system, or after entry into the heat-treating system but prior to entry into the firing or combustion zone thereof. Alternatively, the agglomerates can be introduced alone, if desired, and without admixture of raw feed, but the process is of the greatest economic importance at the present time as a means of returning collected dusts to a main burning or clinkering process. Whether the agglomerates are added alone or in admixture with raw feed, it is preferred that they be introduced into the heat-treating system, which can, for example, be a rotary kiln, at a temperature zone which is below the temperature of the firing or combustion zone. That is to say, when a slurry, for instance, is fed into a rotary kiln, the first portion of the kiln acts as a drier, a subsequent portion as a calciner, and, finally, the combustion zone as a firing zone or a reaction zone. Where a relatively dry feed is employed, some removal of water occurs in the early stages, then, probably, calcining of at least some constituents, and, finally, firing or clinkering. There is a progressive increase in temperature in such a device, or heat-treating system, from the feed end to the firing, clinkering or reaction zone. The introduction of agglomerates into such a system is controlled so that there is effected progressive heating of the agglomerates to the highest temperature. As set forth below, in an example, in a system, such as a rotary kiln, which contains the drying zone, a heat-exchanger zone, sometimes known in practice as the "chain-section", and, further on, a combustion zone where clinkering substantially takes place, where Portland cement raw materials are treated, they are introduced at the feed end, progress through the drying zone, and the heat-exchanger zone and on to the combustion zone. The agglomerated kiln dust is introduced at a point before the materials enter the combustion zone; for example, suitably, beyond the heat-exchanger zone, but prior to the combustion zone; or, in other words, at a point in the path of travel of the material toward and spaced from the combustion zone.

It is an advantage of the present process that such agglomerates can be fed back into the calcining or heat-treating operation with incoming raw feed, which may be dry, as in lump-roasting, or which may be wet, or slurry feed. In the latter case, the dust so agglomerated will not exert, for example, its hydraulic action where such characteristic exists, and viscosity of the slurry is not appreciably changed. It is another advantage that, alternatively, the agglomerated dust can be fed into a rotary kiln, for instance, at an intermediate point enabling greater kiln efficiency. Further advantages are that the circulating dust load is decreased and there is more efficient recovery of the starting material values. Another advantage which is obtained is that, in a wet process, the water load to the kiln is reduced by using the agglomerates of this invention.

One embodiment of the present invention is illustrated by the annexed drawing which is a schematic diagram, the parts thereof being clearly designated. This drawing illustrates particularly an embodiment wherein cement dust is treated according to the present invention, and this embodiment is also described in more detail below.

The method of the invention is more clearly illustrated by the following example, wherein dusts, recovered by electrical precipitation from stack gases, are treated according to the invention.

Slurry for making Portland cement is fed to a rotary kiln, the slurry being of about 61% solids content and having, on the ignited basis, the following analysis: 25% $SiO_2$, 3% $Fe_2O_3$, 3% $Al_2O_3$ and 67.7% $CaO$. The slurry is dried and fired during its progress through the kiln and emerges as cement clinker. The stack gases which go off are subjected to the Cottrell electrical precipitation treatment and the dust content is recovered. It can be stored, if desired, in any convenient way. The recovered dust has approximately the following analysis: 20.9% $SiO_2$, 2.9% $Fe_2O_3$, 3.0% $Al_2O_3$, and 71.8% $CaO$. To produce a clinker of the desired composition, therefore, clay is added. The dust is fed to a nodulizing drum and the clay is added, by spraying, in the form of a slurry in water, the slurry advantageously containing 54% or less of clay. In this example, 10 gallons of 54% clay slurry in water are fed per minute in treating 20 tons of collected dust per hour. The nodules issuing from the drum can be allowed to dry and harden, or they can be fed directly to the kiln. The nodules so prepared contain from about 17% to 19% water. In this example, they are fed to the kiln at a point about 20% of its length beyond the feed end, that is, at a substantial distance ahead of the combustion zone. The rotary kiln employed in this example is a commercial kiln, provided at the place noted with three feed scoop devices or conduits, extending into the interior of the kiln through the wall thereof, the outer portions of the devices being disposed within a short annular or cylindrical device which jackets the kiln, is air-tight and into which a supply of nodules is fed from the nodulizer. The nodules then pass into the kiln through the scoops or conduits. The nodules thus enter the kiln and mix with the incoming feed materials beyond the heat-exchanger zone. This zone contains free-hanging chains which would tend to disintegrate the nodules, especially if they had not thoroughly hardened. Also, the nodules are not introduced directly into the firing or combustion zone where they would tend to explode or disintegrate too rapidly. In this manner, the nodules, or agglomerates formed in any other desired manner, are subjected to progressive heating and dehydration up to the firing zone. Alternatively, the nodules, or other agglomerates, can be introduced into the feed before or as it enters the kiln. Further, where no chains, or other devices which would beat the nodules etc., are present at the feed end of a rotary kiln, the agglomerates can be fed in at any point but preferably prior to the last one-fourth of the length of the kiln, or the combustion zone. The dust load is decreased substantially by this method and the inorganic dusts recovered from the collecting system are efficiently recovered, decreasing the losses of product. If desired, the fraction of the dust which is high in alkali can be separated and removed from the dust prior to agglomeration, but if desired, all of the dust can be nodulized or otherwise agglomerated.

In another operation, like the one above described except that the collected dust was not nodulized, it was attempted to re-introduce the dust into the incoming fresh feed slurry. To accomplish this, the incoming Portland cement-forming slurry was fed through a pug mill and dry dust from the Cottrell system was introduced simultaneously into this mill. It was found that the dust tended to flush through the mill without being assimilated by the slurry, that mud rings built up just ahead of the heat-exchanger zone, which necessitated their removal from time to time in order to enable flow of material and of gases; and that the dust which was taken up by the slurry in pugging appeared to form balls of dry dust coated with a slurry layer, resulting in release of the dust into the gas stream when the balls were attacked by the chains in the heat-exchanger system. These combined effects resulted in inefficient utilization of the dust.

The clay can be admixed with the dust in the dry state in any desired manner. However, it is especially advantageous to add it as a slurry, as installation and operation of milling and mixing equipment for this purpose is eliminated. The clay in the above example has approximately the following analysis: 50% $SiO_2$, 14% $Fe_2O_3$, 19% $Al_2O_3$, 7% $CaO$ and 5% $MgO$. Clay of other suitable analysis can also be employed. If the raw cement materials are sufficiently high in alumina and fluxing constituents, it is not always necessary to add clay or other corrective material, some of which may be present in solution in the water, and the Cottrell dust can be agglomerated without correcting additions, either by nodulizing, by extruding to form pellets, or by briquetting, etc., as described herein.

The method of the present invention is also very useful in treating the collected dusts recovered in burning dolomite. The dust recovered in the Cottrell precipitator, for instance, is nodulized while spraying with water, and charged to the kiln with incoming dolomite, or at any other desired point prior to entry into the combustion zone.

Although the above examples show calcining or heat-treating in a rotary kiln, the process of this invention is useful with other apparatus for calcining or heat-treating inorganic materials. Amounts herein are expressed in percent by weight, unless otherwise indicated.

Having now described the invention, what is claimed is:

1. A process of utilizing cement kiln hydraulic dust recovered from stack gases issuing from a cement kiln system containing a heat exchanging zone, a calcining zone, and a firing zone wherein Portland cement raw material is dried, calcined and fired while progressing through said zones, which comprises forming agglomerates from said recovered dust in a mixing zone separate from said kiln system by intimately mixing therewith a water slurry containing up to 54% clay, introducing said agglomerates into said kiln system at a point in the path of travel of said material subsequent to said heat exchanging zone and prior to said firing zone, and conducting said agglomerates to said firing zone while effecting progressive heating thereof.

2. In a process of utilizing cement kiln hydraulic dust recovered by electrical precipitation from stack gases issuing from a cement kiln system, which system contains a heat exchanging zone, a calcining zone, and a firing zone wherein Portland cement raw material is dried, calcined and fired while progressing through said zones, the improvement which comprises forming agglomerates from said recovered dust in a mixing zone separate from said kiln system by intimately mixing water therewith in amount from 10 to 25% in a slurry containing up to 54% clay, introducing said agglomerates into said kiln system at a point in the path of travel of said material subsequent to said heat exchanging zone and prior to said firing zone, and conducting said agglomerates to said firing zone while effecting progressive heating thereof.

3. In a process of utilizing hydraulic dispersoids recovered for stack gases issuing from a cement kiln system containing a heat exchanging zone, a calcining zone, and a firing zone wherein Portland cement raw material is dried, calcined, and fired while progressing successively through said zones, the improvement which comprises forming nodules from said recovered dispersoids in a mixing zone separate from said kiln system by intimately mixing water therewith in amount from 10 to 25% in a slurry containing up to 54% clay, introducing said nodules into said kiln system at a point in the path of travel of said material subsequent to said heat exchanging zone and prior to said firing zone, and conducting said nodules to said firing zone while effecting progressive heating thereof.

References Cited in the file of this patent

UNITED STATES PATENTS

| Number | Name | Date |
|---|---|---|
| 292,329 | Lesley | Jan. 22, 1884 |
| 1,741,544 | Slagle et al. | Dec. 31, 1929 |
| 1,865,554 | Bradley | July 5, 1932 |
| 2,073,105 | Hoffmann | Mar. 9, 1937 |
| 2,164,950 | Schulze | July 4, 1939 |
| 2,277,663 | Francis et al. | Mar. 31, 1942 |
| 2,477,262 | Mooser | July 26, 1949 |